United States Patent [19]
Kubota

[11] Patent Number: 6,009,244
[45] Date of Patent: *Dec. 28, 1999

[54] IMAGE COMMUNICATION APPARATUS HANDLING CONCURRENT STORING AND READING REQUESTS

[75] Inventor: Toshiji Kubota, Tokyo, Japan

[73] Assignee: Canon Kabushiki Kaisha, Tokyo

[*] Notice: This patent issued on a continued prosecution application filed under 37 CFR 1.53(d), and is subject to the twenty year patent term provisions of 35 U.S.C. 154(a)(2).

[21] Appl. No.: 08/889,183

[22] Filed: Jul. 7, 1997

Related U.S. Application Data

[62] Division of application No. 08/200,443, Feb. 23, 1994, Pat. No. 5,727,136.

[30] Foreign Application Priority Data

Feb. 23, 1993 [JP] Japan ................................. 5-033612
Feb. 10, 1994 [JP] Japan ................................. 6-016251

[51] Int. Cl.[6] .......................... H04N 1/21; H04N 1/23; G06K 15/02
[52] U.S. Cl. .................... 395/114; 395/115; 358/444; 358/468
[58] Field of Search ................... 395/112, 114, 395/115, 116; 358/444, 468, 404; 364/134

[56] References Cited

U.S. PATENT DOCUMENTS

| | | |
|---|---|---|
| 4,164,787 | 8/1979 | Aranguren . |
| 4,507,760 | 3/1985 | Fraser ...................................... 364/134 |
| 4,947,345 | 8/1990 | Paradise et al. ........................ 358/442 |
| 5,041,918 | 8/1991 | Ishida et al. ............................ 358/442 |
| 5,383,030 | 1/1995 | Seo ......................................... 358/442 |

FOREIGN PATENT DOCUMENTS

| | | | |
|---|---|---|---|
| 0249720 | 12/1987 | European Pat. Off. | ........ G06F 15/16 |
| 0426412 | 5/1991 | European Pat. Off. | ......... H04N 1/32 |
| 0456447 | 11/1991 | European Pat. Off. | ........ G06F 13/16 |

OTHER PUBLICATIONS

Derwent Publications Ltd., London, GB, AN 90–318490 & Patent Abstracts of Sweden, Bilaga till Svensk Patenttidning, nr. 31, Jul. 20, 1990 & SE–A–8 900 132 (Televerket), Jul. 17, 1990.

*Primary Examiner*—Scott Rogers
*Attorney, Agent, or Firm*—Fitzpatrick, Cella, Harper & Scinto

[57] ABSTRACT

A facsimile apparatus uses a single memory in a facsimile system and a printer system without using an interface between the two systems. In the facsimile apparatus, a FAX controller stores data received via a communication line. A recording control circuit fetches data from the memory via a data bus, and records an image based on the fetched data. A memory intervention circuit outputs a data bus selection signal, and switches an address of access to the recording medium and a connection of the data bus. Thus, a single memory is shared between a facsimile system and printer system.

5 Claims, 11 Drawing Sheets

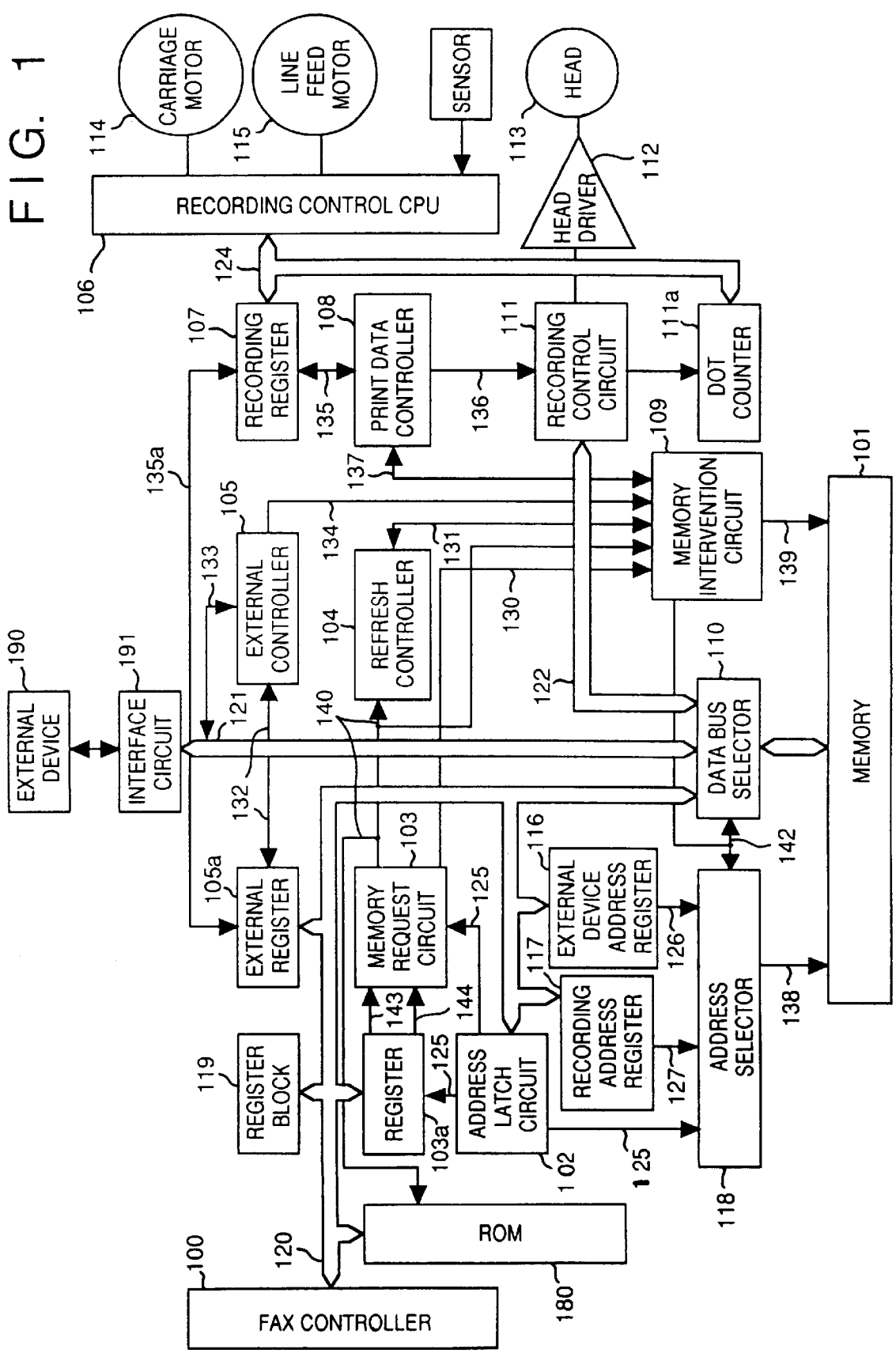

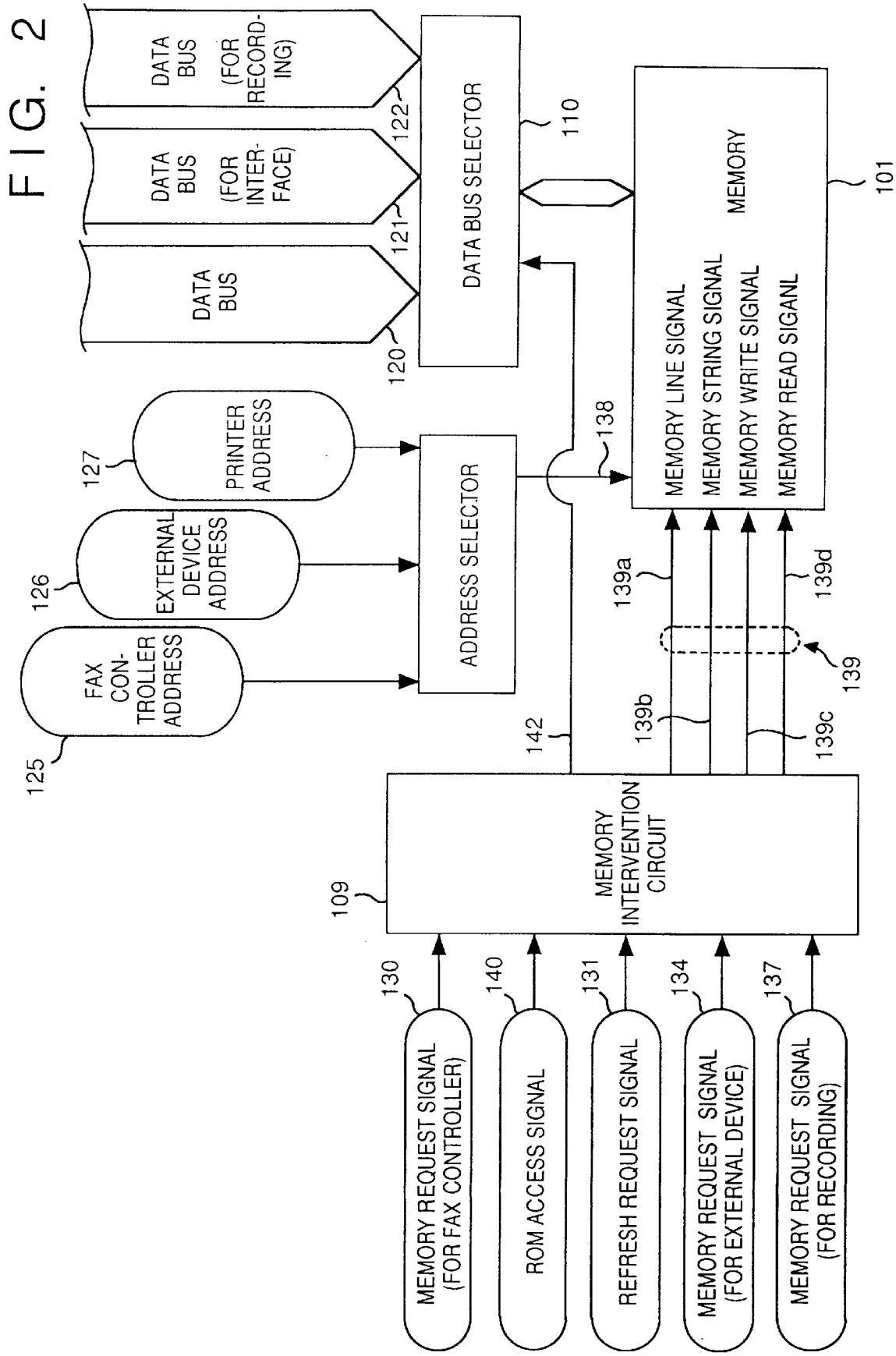

FIG. 4

OUTPUT STATE OF MEMORY INTERVENTION CIRCUIT

| OPERATION STATE | MEMORY LINE ADDRESS | MEMORY LINE SIGNAL | MEMORY WRITE SIGNAL | MEMORY STRING ADDRESS | MEMORY STRING SIGNAL | MEMORY READ SIGNAL | DATA BUS SELECTION |
|---|---|---|---|---|---|---|---|
| W1 | VALID | FALSE | FALSE | INVALID | FALSE | FALSE | FALSE |
| W2 | VALID | TRUE | TRUE | INVALID | FALSE | FALSE | TRUE |
| W3 | INVALID | TRUE | TRUE | VALID | FALSE | FALSE | TRUE |
| W4 | INVALID | TRUE | TRUE | VALID | TRUE | FALSE | TRUE |
| W5 | INVALID | TRUE | FALSE | VALID | TRUE | FALSE | FALSE |
| W6 | INVALID | FALSE | FALSE | INVALID | FALSE | FALSE | FALSE |
| R1 | VALID | FALSE | FALSE | INVALID | FALSE | FALSE | FALSE |
| R2 | VALID | TRUE | FALSE | INVALID | FALSE | FALSE | FALSE |
| R3 | INVALID | TRUE | FALSE | VALID | FALSE | FALSE | FALSE |
| R4 | INVALID | TRUE | FALSE | VALID | TRUE | TRUE | TRUE |
| R5 | INVALID | TRUE | FALSE | VALID | TRUE | TRUE | TRUE |
| R6 | INVALID | FALSE | FALSE | INVALID | FALSE | FALSE | FALSE |
| F1 | INVALID | FALSE | FALSE | INVALID | TRUE | FALSE | INVALID |
| F2 | INVALID | TRUE | FALSE | INVALID | TRUE | FALSE | INVALID |
| F3 | INVALID | TRUE | FALSE | INVALID | TRUE | FALSE | INVALID |
| F4 | INVALID | TRUE | FALSE | INVALID | TRUE | FALSE | INVALID |
| F5 | INVALID | FALSE | FALSE | INVALID | FALSE | FALSE | INVALID |

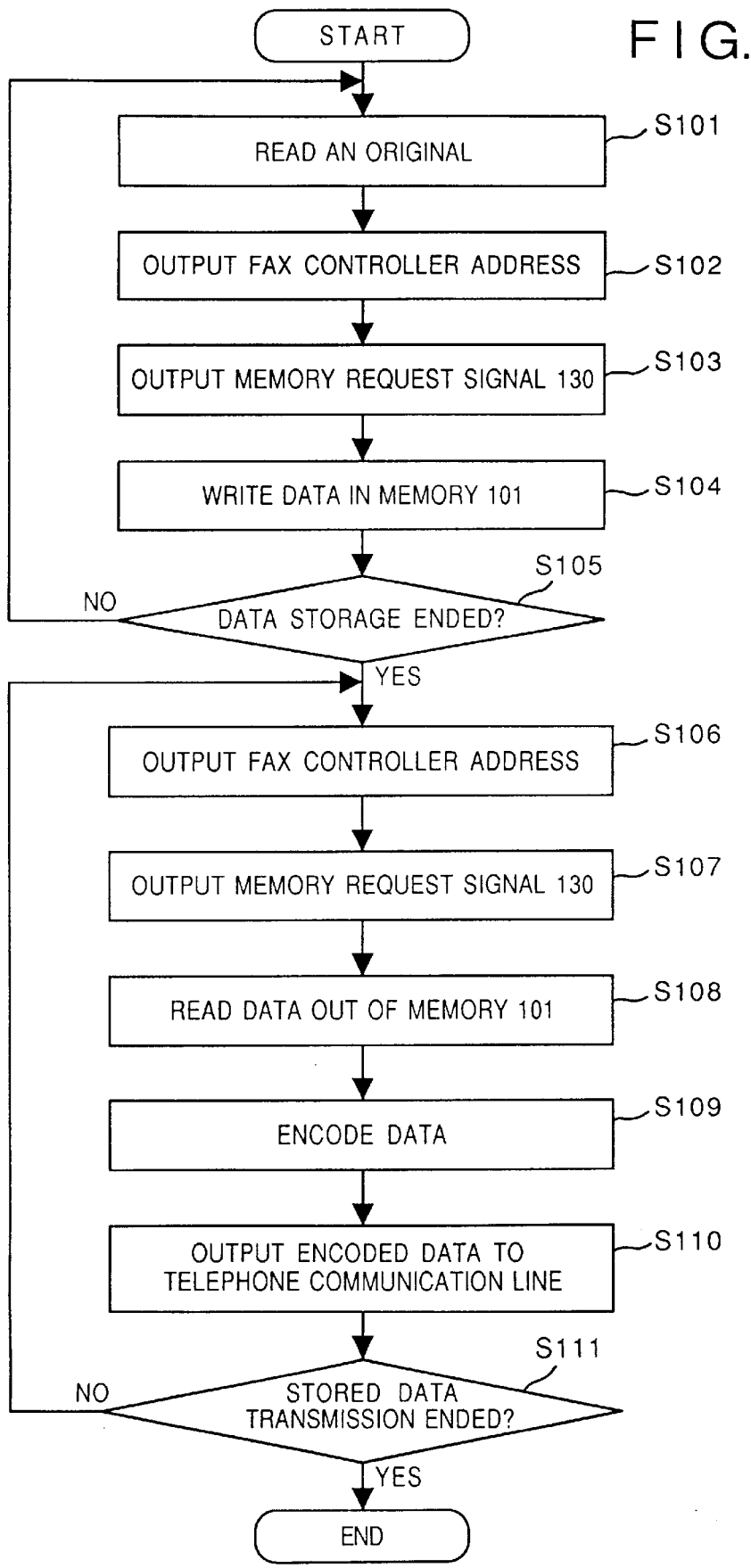

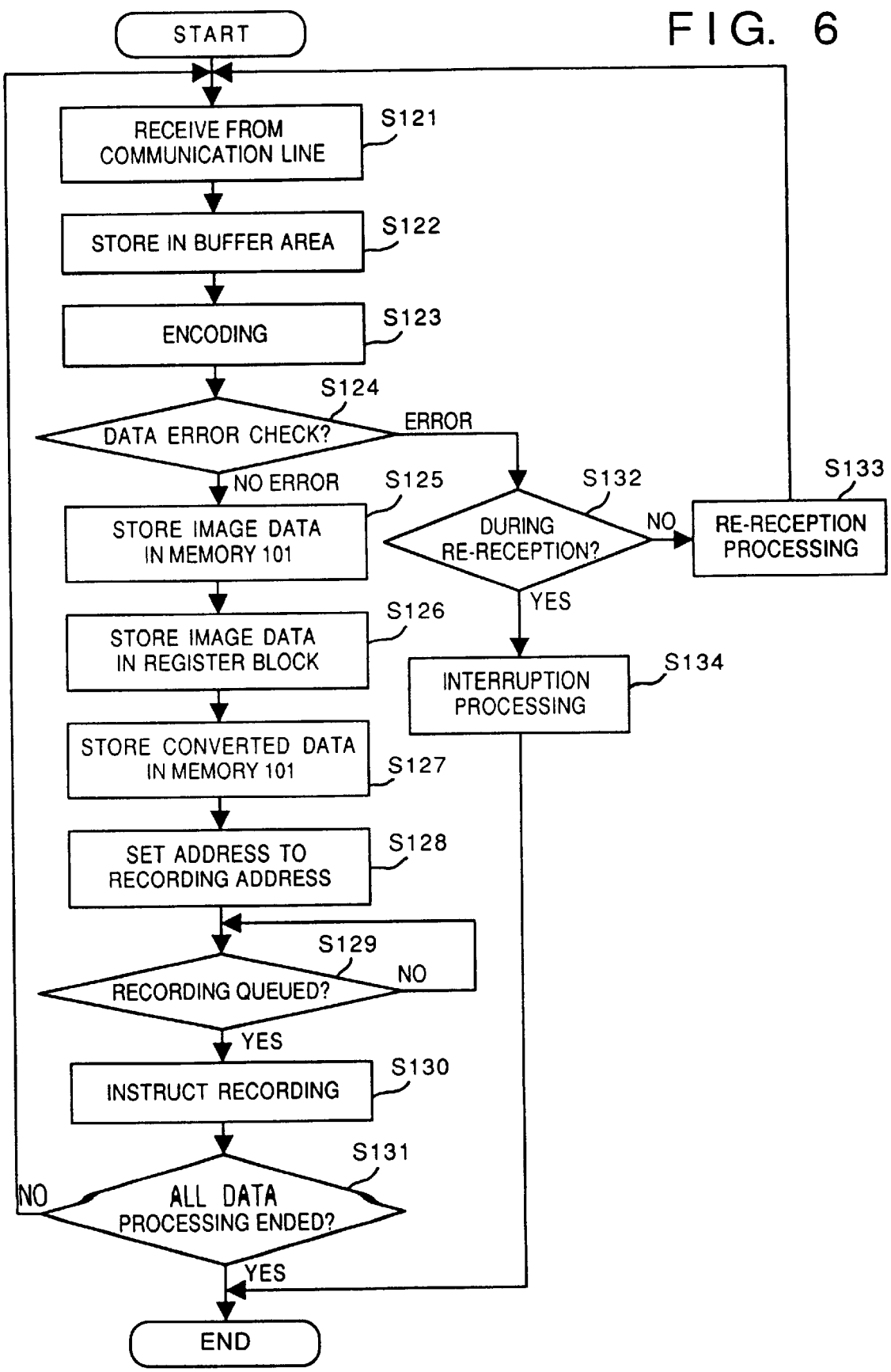

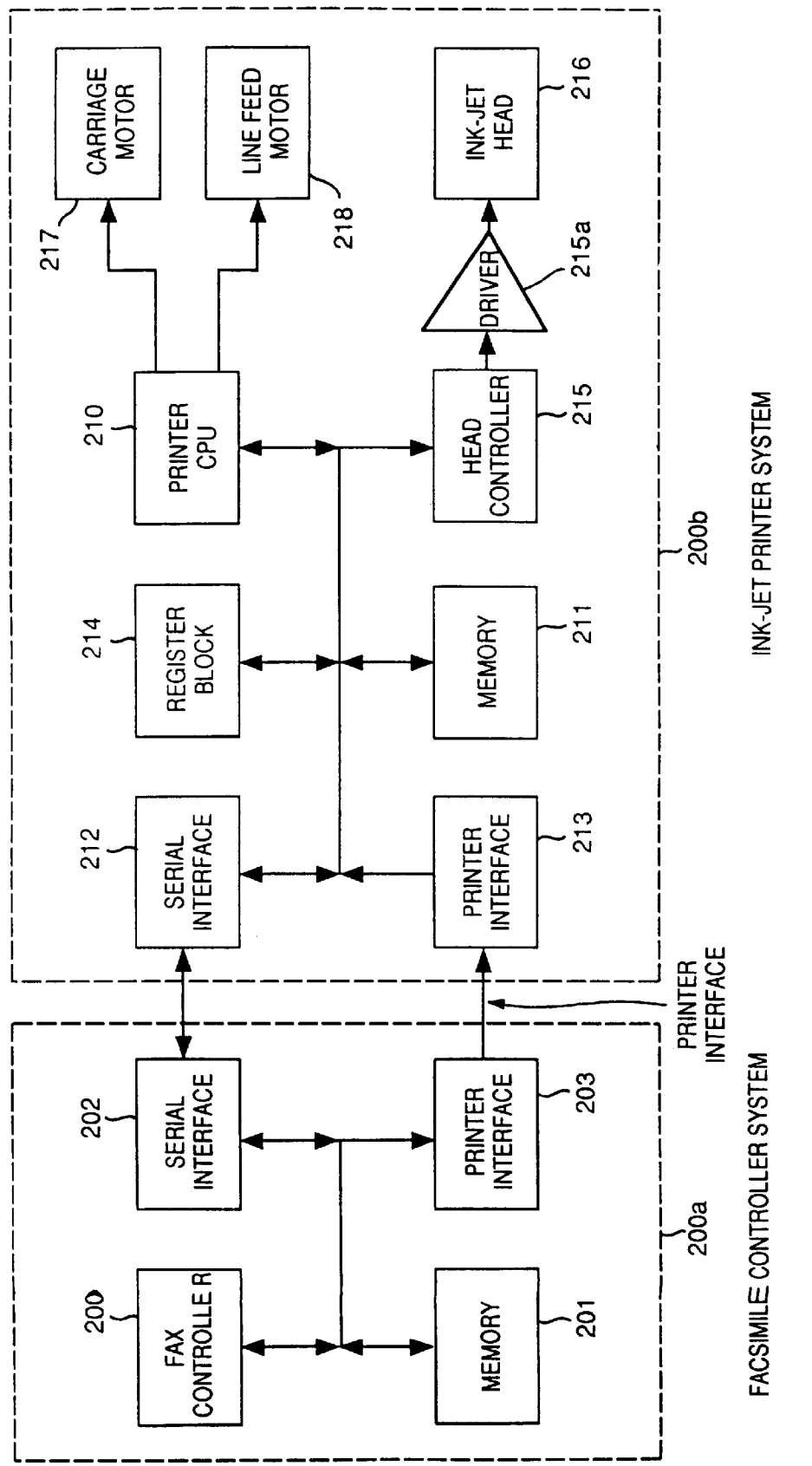

IMAGE COMMUNICATION APPARATUS HANDLING CONCURRENT STORING AND READING REQUESTS

This application is a division of application Ser. No. 08/200,443 filed Feb. 23, 1994, now U.S. Pat. No. 5,727,136.

BACKGROUND OF THE INVENTION

The present invention relates to an image communication method and apparatus.

FIG. 10 is a block diagram illustrating the construction of a general facsimile apparatus having an ink-jet printer as a recording apparatus.

In FIG. 10, numeral 200a is a facsimile controller system, and numeral 200b is an ink-jet printer system. In this facsimile apparatus, data transmitted from the facsimile controller system 200a is received by the ink-jet printer system 200b, and the image data for recording included in the received data is printed on a recording medium.

Numeral 200 is a facsimile controller (FAX controller) which performs reading of an original image, control of transmission/reception via to a telephone communication line, and sending of data transmission and recording instructions to an ink-jet printer system 200b. Numeral 201 is a memory for the facsimile controller system which stores read data of an original or reception data received from the telephone communication line. That is, the FAX controller 200 sends operation instructions to an ink-jet printer system 200b via a serial interface 202, and supervises the state of the ink-jet printer system 200b, e.g. noting error states caused by running out of paper.

Numeral 203 is an interface circuit for printer data (printer interface), which transmits a control code and image data to execute recording with respect to the ink-jet printer system 200b. As an example of the printer interface 203, there is a CENTRONICS interface which is generally by a printer controller.

The construction of the ink-jet printer system 200b is described below.

In FIG. 10, numeral 210 is a printer CPU which performs various controls in the ink-jet printer system 200b. Numeral 211 is a memory for the ink-jet printer system 200b which stores data received from facsimile controller system 200a. Numeral 212 is a serial interface which receives operation instructions transmitted from the facsimile controller system 200a. Furthermore, the serial interface 212 transmits the facsimile controller system 200a from the instruction of the ink-jet printer system 200b.

Numeral 213 is an interface circuit for print data (printer interface) which receives a control code and image data transmitted from the facsimile controller system 200a. Numeral 214 is a register block capable of reading and writing. The printer CPU 210 writes the received image data into the register block 214, and converts the written image data to correspond to the recording form of a printer head 216, and then outputs it. The printer CPU 210 can read the converted result.

Numeral 215 is a head controller of the ink-jet printer which is initialized by the instruction of the printer CPU 210. The head controller 215 fetches recording data out of the memory 211, and performs transmission of recording data and recording control to the ink-jet head 216. The ink-jet head 216 performs recording in accordance with the control of the head controller 215 driven by a driver 215a.

Numeral 217 is a carriage motor, and numeral 218 is a line feed motor. These motors are respectively driven by a control signal of the printer CPU 210.

The operation of the facsimile system having the above-described ink-jet printer is described below.

The facsimile controller 200 sequentially supervises the state of the ink-jet printer system 200b via the serial interface 202 or the printer interface 203. When it is determined that the ink-jet printer system 200b is in the standby state, the image data which is a result of reading on original or a result of data reception is stored in the memory 201. If a predetermined amount of image data is stored in the memory 201, the facsimile controller 200 transmits the recording start instruction to the ink-jet printer system 200b.

The ink-jet printer system 200b starts receiving data from the facsimile controller system 200a as a result of such instruction. That is, the data transmitted from the printer interface 203 is received by the printer interface 213, and is sequentially stored in the memory 211. The printer CPU 210 supervises this, and fetches the data when a predetermined amount of data has been stored in this way in the memory 211. Subsequently, the printer CPU 210 deletes data which is unnecessary for recording, and converts the remaining data into the recording data for ink-jet recording by the register block 214. The recording data generated in this way is stored in a predetermined recording data area in the memory 211 which is reserved as a print buffer.

After the recording data storage, the ink-jet head 216 starts recording. The printer CPU 210 performs recording processing at a predetermined timing. At the recording timing, the printer CPU 210 sets recording control data obtained from the result by referring to ambient temperature and humidity and the history of past recording data stored in the head controller 215, and then transmits a recording start signal. At the same time, the printer CPU 210 transmits control signals to the carriage motor 217 and line feed motor 218 respectively. The head controller 215 to which the recording start signal is transmitted from the printer CPU 210 reads the recording data out of the recording data area of the memory 211, drives the ink-jet head 216 in accordance with the predetermined recording control data, and performs recording on the recording medium.

The above-described general facsimile apparatus performs interface between the facsimile controller system 200a and the ink-jet printer system 200b by an printer interface. Accordingly, the facsimile controller system 200a and the ink-jet printer system 200b respectively require a printer interface circuit, serial interface circuit and data storage memory. This makes it more difficult to reduce the size of the apparatus and to reduce its cost.

Furthermore, since the above-described facsimile apparatus does not include a function to receive data transmitted from a personal computer, storage, recording or transmission to a telephone communication line of the data transmitted from the personal computer via the printer interface can not be processed.

SUMMARY OF THE INVENTION

In light of the above problem, it is a first object of the present invention to provide an image communication method and apparatus capable of minimizing size and reducing cost by sharing a memory wherein an image data reception system and an image recording system, without using an interface in both systems.

It is a second object of the present invention to provide an image communication method and apparatus capable of storing, recording, or outputting to a telephone communication line, data transmitted from the printer interface of a personal computer.

According to the present invention, the foregoing first object is attained by an image communication apparatus comprising: reception means for storing data received from an external apparatus in a memory means via a first bus; recording means for fetching the data stored in the memory means via a second bus connected to the memory means, and recording an image based on the data; and switching means for switching an address for access to the memory means corresponding to the access request to the memory means by the reception means and the recording means, and switching the connection of the first bus and second bus which are connected to the memory means.

The foregoing second object is attained by an image communication method comprising: a connection step of connecting a first bus to a memory means; a reception step of storing data received from an external apparatus in the memory means via the first bus; switching step of switching the bus to be connected to the memory means from the first bus to the second bus; and a recording step of fetching the data stored in the memory means via the second bus connected to the memory means, and recording an image based on the data.

With the above construction, the reception means stores data received from an external apparatus to a memory means via a first bus. The recording means for recording received data fetches the data from the memory means via a second bus, and performs a recording based on the data. Furthermore, an access address to the memory means is switched, and the connection between the memory means and the first or second bus is switched, in accordance with the execution of the reception means and recording means. Accordingly, a memory of the reception means (for example, the facsimile system), and a memory of the recording means (for example, the printer system), are incorporated, and an interface between these systems is not needed.

Furthermore, the foregoing second object is attained by an image communication apparatus comprising: communication means for accessing a memory means via a first bus to perform transmission/reception with an external apparatus, and performing data writing or data reading to/from the memory means; recording means for fetching the data stored in the memory means and recording an image based on the data; a third bus connecting to the memory means for connecting to other external apparatus; interface means for performing either one of transmission with other external apparatus, writing or reading of received data with respect to the memory means; and switching means for switching an address for access to the memory means in accordance with the access to the memory means by the communication means, recording means and external interface means, and switching the connection by selecting a bus to be connected to the memory means from the first bus, second bus and third bus.

Furthermore, the foregoing second object is attained by an image communication method comprising: a communication step of accessing a memory means via a first bus to perform transmission/reception with an external apparatus, and performing data writing/data reading to/from the memory means; a recording step of fetching the data stored in the memory means and recording an image based on the data; an interface step of performing either transmission to other external apparatus or writing/reading of received data with respect to the memory means via a third bus connecting to the memory means for connecting to other external apparatus; and a switching step of switching the connection for switching an address of access to the memory means, and selecting a bus to be connected to the memory means from the first bus, second bus and third bus, in accordance with the access to the memory means by the communication step, recording step and external interface step.

According to the construction to attain the second object, interface means connecting the external apparatus to a memory means via a third bus is included, for example, data received from the external apparatus is stored in the memory means. Switching means switches an access address to the memory means in accordance with the access to the memory means by the reception means, recording means and external interface means, and switches the connection of a bus by selecting a bus to be connected from the first, second and third bus. Thus, a memory of the reception means (for example, facsimile system), a memory of the recording means (for example, printer system), and a memory of the interface means are incorporated, and, for example, an output of the data inputted via the printer interface to a communication line and recording on a recording medium are possible.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1 is a block diagram illustrating the construction of an ink-jet printer facsimile system according to the present invention;

FIG. 2 is a diagram for explaining the connection of the memory intervention circuit and a signal in the memory of the present invention;

FIG. 4 is a diagram for explaining a signal output state of the memory intervention circuit;

FIG. 5 is a flowchart illustrating the data transmission procedure of a facsimile apparatus in the present embodiment;

FIG. 6 is a flowchart illustrating the data reception procedure of a facsimile apparatus in the present embodiment;

FIG. 10 is a block diagram illustrating the construction of a conventional facsimile apparatus.

DESCRIPTION OF THE PREFERRED EMBODIMENTS

Figure 3A:
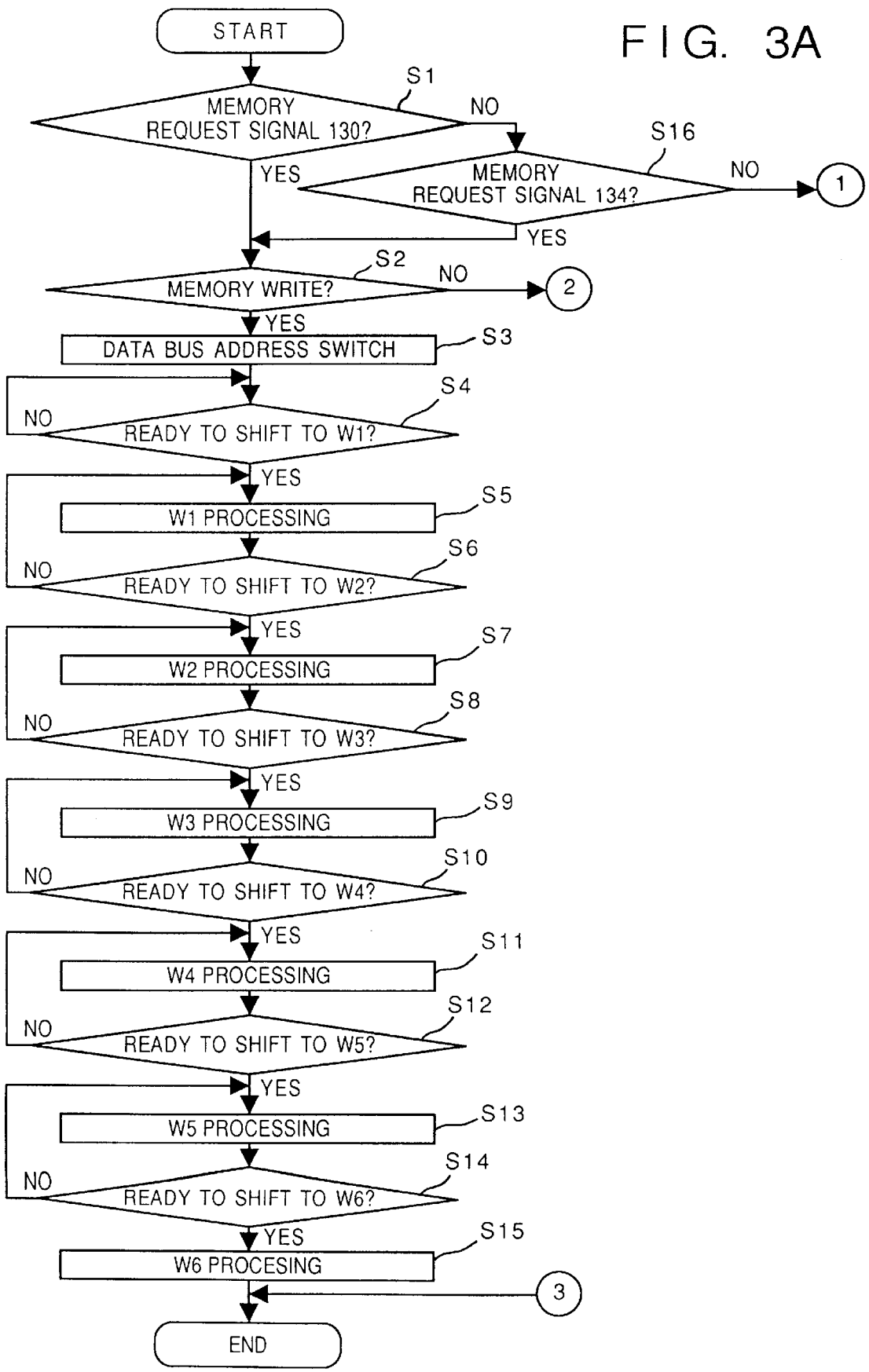
FIGS. 3A and 3B are flowcharts illustrating the operation procedure of the memory intervention circuit of the present invention.

Preferred embodiments of the present invention will now be described in detail in accordance with the accompanying drawings.

FIG. 1 is a block diagram illustrating the construction of an ink-jet printer facsimile system according to the embodiment.

In FIG. 1, numeral 100 is a FAX controller which performs reading of an original, transmission/reception control to a telephone communication line, and data transmission and recording instruction to a recording system in a similar manner as the above-described FAX controller 200. The FAX controller 100 outputs read data and received data to a data bus 120, and outputs a memory address signal to the data bus 120 in the same time division as these data. Numeral 101 is a memory which stores the original data, received data from the telephone communication line, recording data for the ink-jet printer and transmission data from an external device 190. Numeral 102 is an address latch circuit which latches address information outputted in the same time division as various data in the data bus 120 from the FAX controller 100 as FAX controller address.

Numeral 103a is a register for system control capable of data writing and data reading by the FAX controller 100. Based on the written data in the register 103a, a capacity set switching signal 143 to switch the capacity setting in the memory 101 arranged on the address of the FAX controller 100, and a capacity switching signal 144 to switch the capacity of the ROM 180 arranged on the address of the FAX controller 100 are outputted to a memory request circuit 103.

The memory request circuit 103 is connected to the capacity set switching signal 144 of the memory 101, a capacity switching signal of the ROM 180, and FAX controller address 125 which is an output address of the FAX controller. The memory request circuit 103 sequentially supervises the FAX controller address 125, and generates a memory request signal 130 when the FAX controller 100 detects an access to the memory 101. Furthermore, the memory request circuit 103 generates an access signal (ROM access signal 140) to the ROM 180 when the FAX controller 100 accesses the ROM 180.

The condition determination of time-division address signal of the FAX controller 100 is changed based on the output of the capacity set switching signal 143 of the memory 101 and a capacity switching signal of the ROM 180. That is, the FAX controller address can be changed by each of the switching signals 143 and 144.

Accordingly, each capacity of the ROM 180 and the memory 101 can be flexibly set according to the system.

Numeral 104 is a refresh controller of the memory 101. The refresh controller 104 counts a ROM access signal 140 outputted from the memory request circuit 103. When a predetermined count value is reached, the counter is reset, the counting is started again, and a refresh request signal 131 is outputted.

Numeral 105a is a register for an external interface (external register), which is connected to data bus 120. The FAX controller 100 performs setting of interface information such as interface permission and selection for the external register 105a in order to execute data communication with the externally connected data device (external device 190), and reads the interface information received from the external device 190 outputted from the external register 105a.

Numeral 105 is an external controller which performs data interface with the external device 190 by an external interface setting signal 132, and outputs the interface state as the external interface setting signal 132. Furthermore, the external controller 105 outputs a memory request signal 134, and performs a memory request to the memory intervention circuit 109, when the memory access request is generated to the memory 101 from the external device 190.

Numeral 191 is an interface circuit for communication with the external device via an interface, such as a CENTRONICS interface or RS 232C interface. The interface circuit 191 is selected based on the interface information set by the external register 105a.

Numeral 106 is a recording control CPU of an ink-jet type, which performs a recording processing at a predetermined timing in the similar to the printer CPU 210 in the above-described ink-jet system. Numeral 107 is a recording register which stores status information in each unit relating to ink-jet recording. At the recording operation, the recording control CPU 106 sets recording control data with reference to the ambient temperature and humidity and the history of past recording data, subsequently the recording system is properly operated and in the recording queued state from the ink-remaining-amount detection, recording-paper-remaining-amount detection, and the content of the recording register 107 including the recording operation state from the print data controller 108, a recording start signal is transmitted. Furthermore, the results of ink-remaining-amount detection and paper-remaining-amount detection and the recording operation state are stored in the recording register 107 as status information. Note that recording control data is data to determine recording time of the ink-jet, timing, and order of applying recording current of the recording control data. The recording control data is set by the recording CPU 106 and stored in the recording register 107.

The above-described recording control data, recording start signal, ink-remaining-amount detection information, recording-paper-remaining-amount detection information, and signal of the operation status of the print data controller 108 are communicated between the recording register 107 and the recording control CPU 106 via the data bus 124. Furthermore, the ink-remaining-detection information, the recording-paper-remaining-amount detection, and the recording state of the print data controller 108 are outputted as a printer status signal 135a, and inputted into the FAX controller 100 via the external register 105a. The recording control data such as recording time, cycle and applying order are outputted to the print controller 108 as a print interface signal 135.

Furthermore, the FAX controller 100 performs recording processing at the start of recording, after the ink-remaining-amount detection information, the recording-paper-remaining-amount detection information, and the recording state of the print data controller 108 are confirmed.

Numeral 108 is a print data controller which outputs the state of recording operation to the recording register 107, and also outputs a recording control signal 136 and a memory request signal 137 indicating the state of the recording operation to the recording register 107 to perform controls such as the recording time of the ink-jet head, the timing, repetition (if needed) of the recording operation and continuous recording (if needed) with reference to the recording control data (an ink-jet printer interface signal 135) set in the recording register 107 by the recording start signal. Numeral 111a is a dot counter which counts recording data. The recording control CPU 106 reads out the count value from the dot counter 111a, and uses the count value as reference data when recording control data is calculated. Numeral 111 is a recording control circuit which transmits printing signals to the ink-jet head such that a pulse recording signal in time division is transmitted to the head driver 112 in accordance with the recording data fetched out of the memory 101.

Numeral 109 is a memory intervention circuit which is connected to memory access signals 130, 134, 137, a refresh require signal 131 and a ROM access signal 140. The memory intervention circuit 109 outputs the data bus selection signal 142 to the data bus selector 110 in accordance with the above-described various signals. The memory intervention circuit 109 outputs a memory line address signal, a memory string address signal, and a memory read/write signal which are required for reading/writing and refreshing operation to the memory 101 through signal lines 139 in a predetermined sequence. The status of each signal on the signal lines 139 for the access to the memory 101 is described later with reference to FIG. 4.

The data bus selector 110 is connected to a data bus 120 which performs data interface with the FAX controller 100, the data bus 121 for the interface which communicates with the external device 190, connected to the recording data bus 122 and the data bus selection signal 142. The data bus selector 110 selects a data bus to be connected to the memory 101 in each memory access by the above-described data bus based on the content of the data bus selection signal 142, switches the data bus, and performs input/output of the memory 101.

Numeral 116 is an external device address register which sets a memory address for an external interface. The external device address register 116 is connected to the data bus 120 of the FAX controller 100, and can be written or read out by the FAX controller 100. When the interface between the external device 190 and the memory 101 is performed, the set address data 126 is outputted as an address signal 138 of the memory 101 via the address selector 118 (to be described later). Furthermore, the data stored in the external device register 116 (that is, a memory address for the external device) is updated at each access of the memory 101.

Numeral 117 is a recording address register which sets a memory address for recording data used by the recording control circuit 111. The recording address register 117 connected to the data bus 120 of the FAX controller 100 can be written and read out by the FAX controller 100. When an interface between the recording control circuit 111 and the memory 101 is performed, the selection address data 127 is outputted as an address signal 138 of the memory 101 via the address selector 118 (to be described later). Furthermore, the data stored in the recording address register 117 (that is, address for recording) is updated by each access of the memory 101.

Numeral 118 is an address selector which determines an accessing address to the memory 101 as an address signal 138. The address selector 118 inputs a FAX controller address 125 by the FAX controller 100, a memory address for the external interface data 126, and a memory address 127 for recording data, selects a single address based on a data bus selection signal 142 (to be described later), and outputs the selected address to the memory 101.

Numeral 112 is a head driver which drives an ink-jet head. The head driver 112 amplifies a pulse recording signal which is transmitted in time division by the recording control circuit 111 for performing recording control of the ink-jet head, and drives the ink-jet head 113. The ink-jet head 113 executes a recording operation in accordance with the head driver 112. Numeral 114 is a carriage motor for the recording head, and numeral 115 is a line feed motor for recording-paper-transferring. These motors are respectively operated in accordance with the control signal from the recording control CPU 106 for the ink-jet recording. Numeral 119 is a register block capable of being read or written by the FAX controller 100. The FAX controller 100 writes the image data in the register block 119. The stored image data is converted and outputted to correspond to the recording form of the ink-jet head 113, and the FAX controller 100 obtains the conversion result by reading the content of the register block 119.

The operation procedure of the memory intervention circuit 109 is described below.

FIG. 2 is a diagram for explaining the connection of the signals of the memory intervention circuit 109 and the memory 101. When the memory intervention circuit 109 receives the memory request signals 130, 134, 137, circuit 109 outputs a data bus selection signal 142 instructing to select an address and a bus with respect to the address selector 118 and data bus selector 110. For example, when the memory request signal 130 for FAX controller is accepted, the data bus selection signal 142 is outputted to the address selector 118 and the data bus selector 110 to select the FAX controller address 125 and the address bus 120 for the FAX controller 100. Furthermore, the signal line 139 is comprised of a memory-line signal line 139a, memory-string signal line 139b, memory write signal line 139c and memory read signal line 139d. The signal line 139 turns each signal on/off at the predetermined timing according to whether the input memory request signal is a write request or a read request signal, and the writing or the reading operation of the memory 101 is executed. The operation of the memory intervention circuit 109 is further described in detail with reference to FIGS. 3A and 3B.

Figure 3B:
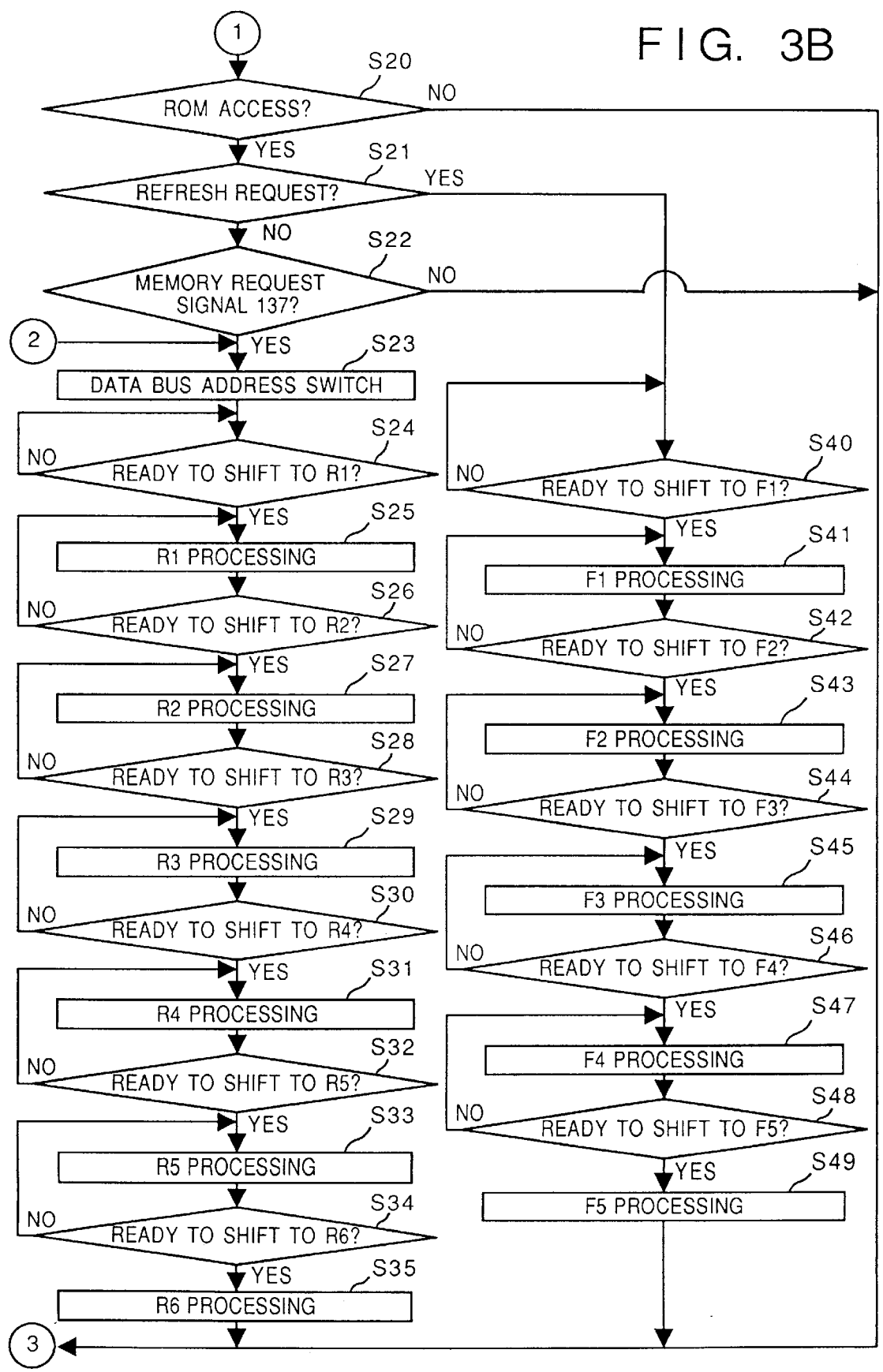

The sequence operation of the memory intervention circuit 109 is shown in FIGS. 3A and 3B, and the state of output signal from the memory intervention circuit 109 is shown in FIG. 4.

At step S1, whether or not a memory request signal 130 is generated is checked. At step S2, whether or not the content of the memory request signal is a write request is determined. If so, the process proceeds to step S3, while if not, the process proceeds to step S23.

When the writing operation is performed on the memory 101, the process proceeds to step S3 where the address selector 118 selects an address of the address latch circuit 102 by the data bus selection signal 142, and selects the data bus 120. The process proceeds to step S4 where the memory intervention circuit 109 waits for completion of the access and a writable state if the access to the memory 101 is during execution. The write operation is divided into six states as shown in FIG. 4. When prepared (that is, when a state can be changed to W1 is ready at step S3), the process proceeds to step S5 where the state is changed to W1. Note that the state W1 is a state where the memory line address in the address signal 138 is confirmed by the data bus selection signal 142, as shown in FIG. 4. In the processing from step S5 to step S15, the state is sequentially changed from W1 to W6 of FIG. 4, and the write operation is completed at W6. Between state W2 and W4, the column of "data selection" is "valid", and the data bus selection is validated by the data bus selection signal 142. For example, when the operation is performed by the memory request signal 130, the data bus 120 is connected to the memory 101, and the data on the data bus 120 is inputted into the memory 101.

A case where the memory request signal 130 is generated and the read operation from the memory 101 is described below. In this case, since the request is not a write request to the memory 101 at step S2, the process proceeds to step S23 where selection of address and data bus is performed as similar to step S3. At step S24, the memory intervene circuit 109 waits for that the access of the memory 101 during execution is completed, and that the state becomes being ready for accessing (state R1). The read operation is divided into six states as shown in FIG. 4. When the preparation is completed, the state is changed to R1 where the memory line address is validated on the address signal 138 by the data bus selection signal 142. Subsequently, the state is sequentially changed from R1 to R6 by executing the processing from step S24 to step S35. Thus, the read operation is completed at state R6.

A case where a memory request signal 134 is generated from the external device 190, and the write operation to the memory 101 is described below. In this case, the process proceeds from step S1 to S16 where whether or not the memory request signal 134 from outside is generated is determined. If generated, the process proceeds to step S3 where the sequence operation output, which is similar to the write/read operation when the memory request signal is generated, is performed.

A case where the refresh request signal 131 is generated is described below. In this case, since a memory request signal is not generated at step S1, the process proceeds step S16. Since a memory request signal from the outside is not generated, the process proceeds from step S16 to step S20. At step S20, whether or not the access signal 140 to the ROM 180 is generated is determined. If the access signal 140 is generated, the process proceeds to step S21, while if not, the present processing is ended. At step S21, whether or not the refresh request signal 131 is generated is determined. If generated, the process proceeds to step S40, while if not, the process proceeds to step S22.

At step S40, the memory intervene circuit 109 waits for the state such that the access to the memory 101 is completed and the next memory access becomes ready (the state can be changed to F1). The refresh operation is divided into five states (F1–F5). When the state becomes ready for changing to F1, the process proceeds to step S41 where the state is changed to F1 by validating a memory line signal. Subsequently, the state is changed from F1 to F5 in steps S42 to S49, and thus, the refresh operation is completed at state F5.

If a refresh signal is not detected at step S21, the process proceeds to step S22 where whether or not a memory request signal 137 is generated from the print data controller 108 is determined. If the memory request signal 137 is generated, the process proceeds to step S23. Subsequently, the memory intervene circuit 109 performs the operation output of various signals by the similar sequence to the read operation by the memory request signal 130.

Furthermore, the operation sequence (FIG. 4) at the writing, reading and refreshing to the memory 101 is an example where the memory 101 is comprised of a DRAM. Accordingly, if the memory 101 is comprised of a SRAM, a line address and a string address are not needed for access, and an access to the memory 101 can be performed by a single address.

The sequence operation in the case where a plurality of memory request signals are simultaneously generated is described below.

For example, a case where a memory request signal 130 from the FAX controller and a memory request signal 134 from the external device 190 are simultaneously generated is described. In this case, at step S1 of FIG. 2, since an input of the memory request signal 130 from the FAX controller is checked, the sequence operation output when only the memory request signal 130 is inputted is first performed. During this time, the request signal 134 from the external device 190 is in queued state until the sequence operation ends.

The refresh controller 104 supervises an access signal 140 to the ROM 180 outputted from the memory request circuit 103. The refresh request signal 131 is outputted from the refresh controller 104 only when the FAX controller 100 has accessed the address of the ROM 180 is detected. Accordingly, the refresh request signal 131 is not generated at the same time as the memory request signals 130, 134.

The memory request signal 137 outputted from the print controller 108 may be generated at the same time as the memory request signals 130, 134 between the input of a recording start signal and the end of recording (the next recording queued state). In this case, the memory intervene circuit 109 accepts a memory request when the ROM access signal 140 is "valid" and the refresh request signal 131 is "invalid". Accordingly, when the memory request signal 130 or 134 is generated, the memory intervene circuit 109 becomes queued to the memory request signal 137.

With the above-described priority, a data bus selection signal 142 is outputted from the memory intervene circuit 109.

The operation of transmission, reception and copy in the ink-jet printer facsimile system of the present embodiment is described below.

Figure 9:
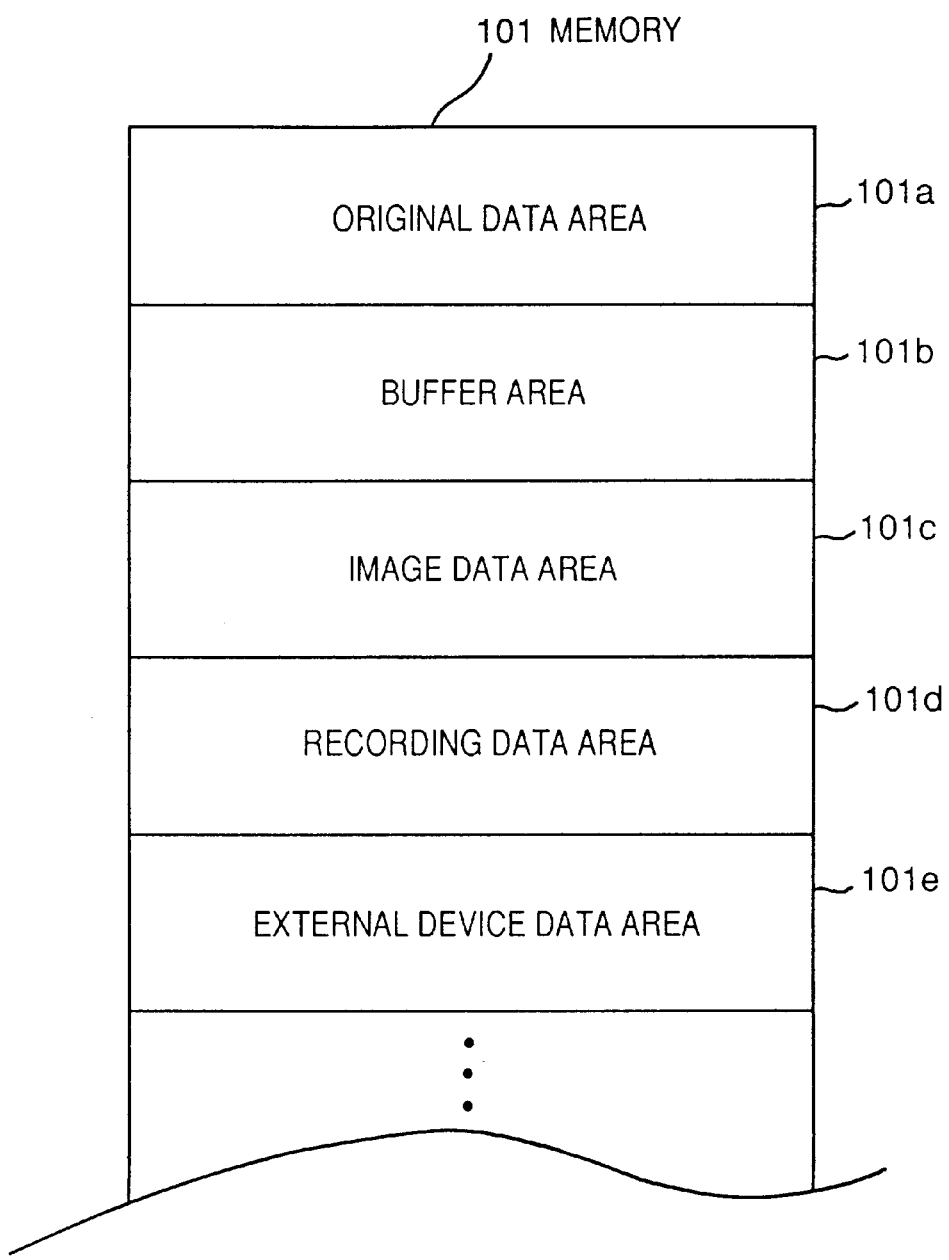
FIG. 9 is a diagram illustrating the area construction of the memory 101 in the present embodiment.

FIG. 9 is a diagram illustrating the memory allocation of the memory 101 of the present embodiment. In FIG. 9, numeral 101a is an original data area which stores image data of the original read by a scanner. Numeral 101b is a buffer area which temporary stores coded data received via a communication line. Numeral 101c is an image data area which stores image data obtained by decoding the coded data in the buffer area 101b. Numeral 101d is a recording data area which stores recording data obtained by converting the image data to data appropriate for the ink-jet recording operation by the register block 119. Numeral 101e is a data area capable of being accessed by the external device 190.

The data transmission procedure by the facsimile apparatus of the embodiment is first described with reference to the flowchart of FIG. 5.

At step S101, the FAX controller 100 performs reading control of an original and obtains the data. At steps S102–S104, the image data is stored in a predetermined area on the memory 101 (the original data area 101a).

At step S102, when the FAX controller 100 outputs the address on the memory 101 which designates the data to the data bus 120 in the time division, the address latch circuit 102 latches and outputs the data as a FAX controller address 125. Subsequently, at step S103, the memory request circuit 103 receives the data, detects an access request to the memory 101 of the FAX controller 100, and outputs a memory request signal 130. Accordingly, at step S104, the memory intervention circuit 109 executes the memory access sequence operation described in FIGS. 3A and 3B, and the image data is written in the memory 101.

That is, the memory intervention circuit 109 transmits a data bus selection signal 142 which selects a data bus 120 of the FAX controller 100 to the data bus selector 110 and the address selector 118. Accordingly, the address selector 118 selects and outputs a FAX controller address 125, and the data bus selector 110 outputs the data on the data bus 120 for the FAX controller to the memory 101. The image data is stored in the memory 101 by the memory access signal which is outputted while the output state of the memory intervention circuit 109 is sequentially changed from W1 to W6.

At step S105, whether or not the storage of the image data has ended is determined. If not, the process returns to step S101. On the other hand, if ended, the process proceeds to step S106 where the FAX controller 100 transmits the image data in the memory 101 stored in the above-described way to the telephone communication line in the following procedure.

At step S106, the memory address signal outputted from the FAX controller 100 in the time division is latched by the address latch circuit 102. At step S107, the selection of the memory 101 is detected by the latched address, and the memory request circuit 103 outputs a memory request signal 130. Accordingly, at step S108, the memory intervention circuit 109 performs the memory access sequence operation (FIGS. 3A and 3B), and reads the (read) image data from the memory 101. That is, the memory intervention circuit 109 transmits a signal which selects the address 125 for the FAX controller 100 to the address selector 118 and a signal which selects the data bus 120 of the FAX controller 100 to the data bus selector 110. The data bus selector 110 outputs the data read from the memory 101 to the data bus 120 for FAX controller. At step S109, the FAX controller 100 compresses the data read from the memory 101, and transmits the compressed data to a telephone communication circuit at step S110.

Figure 7:
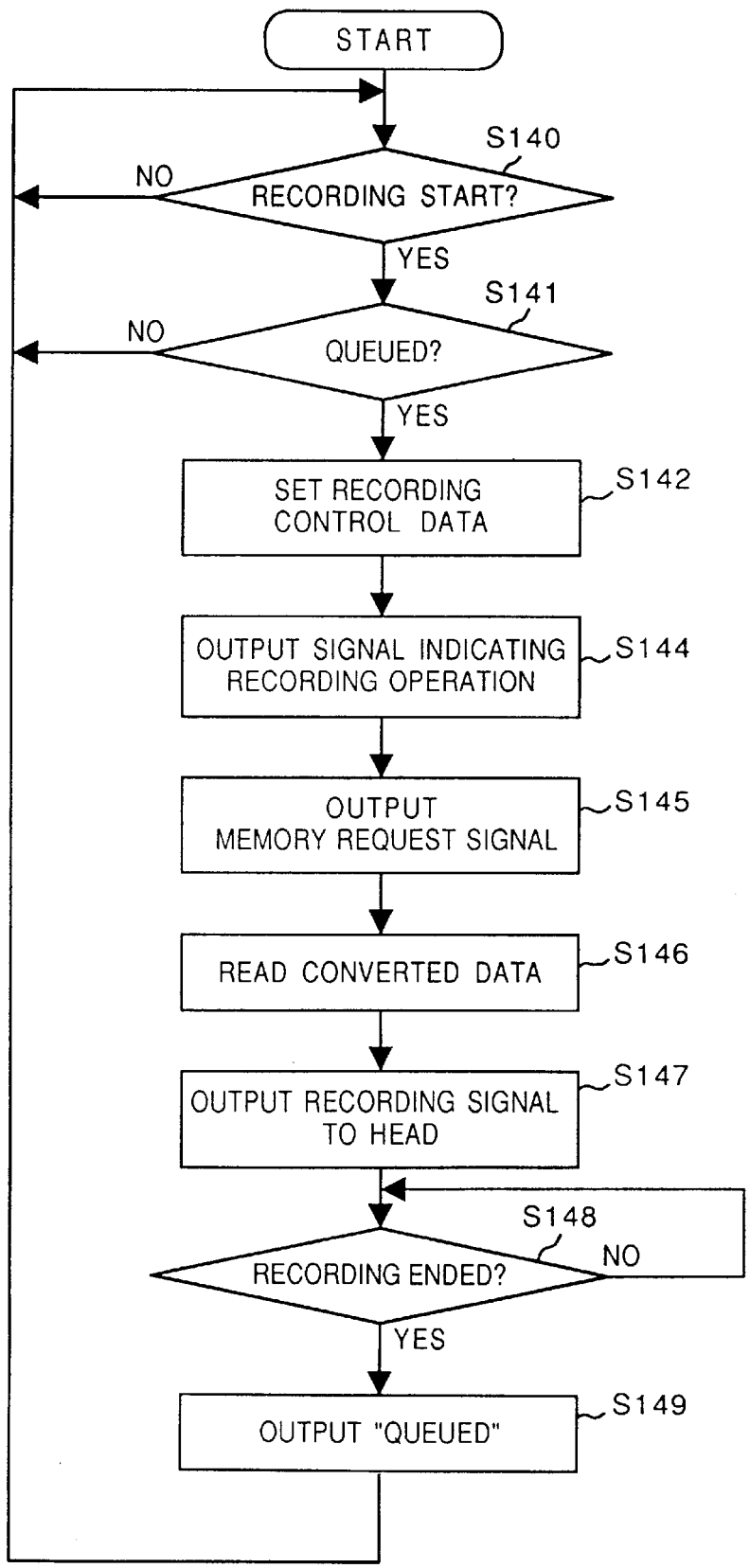
FIG. 7 is a flowchart illustrating the data recording procedure of the facsimile apparatus in the present embodiment.
Figure 8:
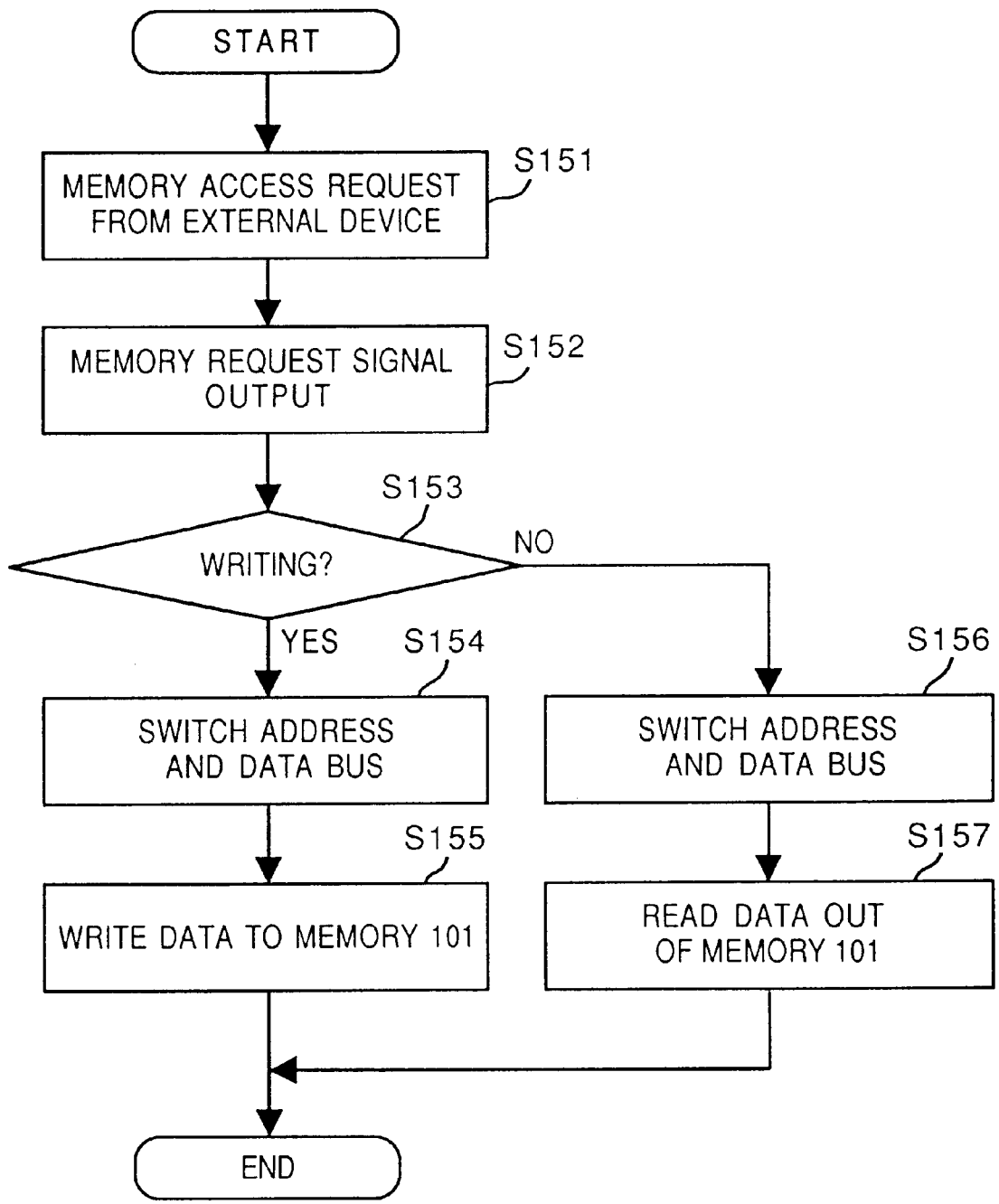
FIG. 8 is a flowchart illustrating the procedure of data reception from an external apparatus of the facsimile apparatus in the present embodiment.

The procedure of the receiving and recording operations is described with reference to FIGS. 6 and 7.

At step S121, the data received from the telephone communication line is stored in the buffer area 101b reserved in the memory 101 at step S122, and decoded at step S123. At step S124, a data error check is performed on each line or communication frame. Note that the data storage procedure at step S122 is similar to the access to the memory 101 of the FAX controller 100.

When a data error has occurred, the process proceeds to step S132 where whether or not the data is one during the re-reception is determined. If not, the re-reception processing is performed on the data by the CCITT communication regulation at step S133. When the data error still remains, the process proceeds from step S132 to step 134 where the communication is interrupted in accordance with the above-described communication regulation.

At step S125, when the correct data is received, and stored in the image data area 101C of the memory 101 as image data, the FAX controller 100 starts the recording operation. At step S126, the FAX controller 100 fetches the image data stored in the image data area 101c of the memory 101, and writes the fetched image data in the register block 119. In the register block 119, after a recording data conversion which is appropriate to the recording operation of the ink-jet head is executed, the converted data is read out and stored in the recording data area 101d in the memory 101. After the storage of the recording data, at step S127, the FAX controller 100 sets the memory address for recording data in the recording address register 117 to set the memory address for recording data. At step S129, whether or not a status signal of the ink-jet printer is in the recording queued is determined. If so, the recording instruction is performed at step S130.

The operation procedure of the ink-jet printer which has received the recording instruction is described with reference to the flowchart of FIG. 7. At step S140, the recording control CPU 106 determines whether or not the recording start instruction is outputted from the FAX controller 100 via the recording register 107. If the recording start instruction is outputted, the process proceeds to step S141. The recording CPU 106 performs the recording processing at a predetermined timing. The recording CPU 106 confirms in each recording timing that the printer system is properly operated and in a queued state (at step S141), and sets the recording control data obtained with reference to the ambient temperature and humidity and the history of past recording data, and then a recording start signal is transmitted.

When the print data controller 108 receives the recording start signal, a signal indicating that the controller 108 is in the recording operation with the ink-jet recording register 107 is outputted at step S144. The output signal 135a of the recording register 107 receives this signal and its output is changed from the recording queued to the in recording operation.

At step S145, the print data controller 108 outputs a memory request signal 137 to the memory intervene circuit 109. At step S146, the memory intervene circuit 109 receives this signal, and reads the converted data from the recording data area 101d of the memory 101. That is, the above-described memory access sequence operation is performed at the timing when the access signal 140 to the ROM 180 of the FAX controller 100 is "valid", and the refresh request signal 131 is "invalid", and a signal to select a recording data memory address 127 (recording data area address) is transmitted to the address selector 118 and a signal to select the recording data bus 122 is transmitted to the data us selector 111. Accordingly, the data bus selector 110 outputs the recording data in the memory 101 to the data bus 122 for recording.

Subsequently, at step S147, the recording control circuit 111 receives this data and transmits a pulse recording signal in the time division to the head driver 112 in accordance with the recording control signal 136 of the print data controller 108. The head driver 112 amplifies the pulse signal in the time division, and drives the ink-jet head 113. The recording CPU 106 respectively outputs a motor drive signal of the carriage motor 114 for the ink-jet head drive control and recording, and a motor drive signal of the line feed motor 115 for recording paper.

At step S148, the end of recording is a waited. If recording has ended, the process proceeds to step S149 where the indication of queued state is outputted. Returning to FIG. 6, whether or not the processing on all data is ended is determined at step S131. If not, the process returns to step S121, while if ended, the present processing ends. As described above, the recording of the (received) data stored in the memory 101 is performed, and the reception processing ends.

The copying operation is described below.

In the copying operation, the FAX controller 100 performs the recording control of an original, and stores the read data in the area (the original data area 101a) on the memory address for the FAX controller. Each area is divided in the memory 101 in advance. The storage procedure is similar to that of the read data storage in the transmission operation (steps S101–S105), the description of which not need to be repeated.

When the data is stored, the FAX controller 100 starts the recording operation. The FAX controller 100 fetches the read data stored in the memory 101, and writes the fetched data in the register block 119. Subsequently, the converted data for the ink-jet head is read out of the register block 119, and stored in the recording data area 101d of the memory 101. The FAX controller 100 transmits the recording instruction after the recording data has been stored.

Subsequently, the recording control CPU 106 performs the control of the recording data, the carriage motor 114 and the line feed motor 115 is performed until the data stored in the memory 101 has been recorded. The detail of the present operation is similar to the above-described recording operation at the reception operation, the description is not repeated.

The procedure of data write/read operation to/from the memory 101 by the external device 190 is described below.

At step S151, when the memory access request is generated from the external device 190, at step S152, the external controller 105 outputs the memory request signal 134 to the memory intervention circuit 109. At step S153, the memory intervention circuit 109 determines whether the memory request signal 134 is for write request or a read request. If it is for write request, the process proceeds to step S154, while if not, the process proceeds to step S156.

At step S154, the address selector 118 selects the content of the external device address register 116 by the data bus selection signal 142, and outputs this content as an address signal 138. Furthermore, the data bus selector 110 selects the data bus 121 for the external device by the data bus selection signal 142, and connects to the memory 101. At step S155, the data writing to the external device data area 101e in the memory 101 is executed.

On the other hand, at step S153, if it is not a write request, the process proceeds to step S156 where the selection and switching of address and data bus are executed in the similar way to step S154. At step S157, the data from the external device data area 101e in the memory 101 is read out.

Furthermore, the procedure of the data writing to the memory 101 in steps S145 and S155, and the details of the procedure of the data reading from the memory in steps S156 and S157 are illustrated in the flowcharts in FIGS. 2, 3A and 3B.

As described above, an access to the memory 101 is possible by the external device 190. For example, a personal computer is connected to the system as an external device 190, and the image data output from the personal computer can be stored in the memory 101 via the data bus 121. When the stored image data is read by the FAX controller 100 and outputted to the telephone communication line, the image output from the personal computer can be transmitted as facsimile information. The transmission procedure by the FAX controller 100 is similar to the procedure from step S106 to step S111 of FIG. 5. Similarly, since the image data is stored in the memory 101, the image data can be recorded in the ink-jet method by the recording control CPU.

As described above, according to the facsimile apparatus of the present embodiment, memories conventionally provided in each system are incorporated, a single memory can be shared in the facsimile controller system and ink-jet recording control system according to the present invention, and a printer interface communication circuit and a serial interface circuit between the facsimile controller system and the ink-jet printer system are not required. Accordingly, the ink-jet printer facsimile system can be reduced in size and the cost can be reduced.

Furthermore, the external interface can be managed by the FAX controller by sharing the above-described memory. For example, the data received from the personal computer via the printer interface is stored, and this is outputted to the telephone circuit or recorded as an output.

In the present embodiment, a printing apparatus having an ink-jet recording head of the type in which printing is performed by forming flying droplets utilizing thermal energy is described.

With regard to a typical configuration and operating principle, it is preferred that the foregoing be achieved using the basic techniques disclosed in the specifications of U.S. Pat. No. 4,723,129 and 4,740,796. This scheme is applicable to both so-called on-demand-type and continuous-type apparatus. In particular, in the case of the on-demand type, at least one drive signal, which provides a sudden temperature rise that exceeds that for film boiling, is applied, in accordance with print information, to an electrothermal transducer arranged to correspond to a sheet or fluid passageway holding a fluid (ink). As a result, thermal energy is produced in the electrothermal transducer to bring about film boiling on the thermal working surface of the recording head. Accordingly, air bubbles can be formed in the fluid (ink) in one-to-one correspondence with the drive signals. A discharging port is made to discharge the fluid (ink) by growth and contraction of the air bubbles so as to form at least one droplet. If the drive signal has the form of a pulse, growth and contraction of the air bubbles can be made to take place rapidly and in appropriate fashion. This is preferred since it will be possible to achieve fluid (ink) discharging having excellent response.

Signals described in the specifications of U.S. Pat. Nos. 4,463,359 and 4,345,262 are suitable as drive pulses having this pulse shape. It should be noted that even better printing can be performed by employing the conditions described in the specification of U.S. Pat. No. 4,313,124, which discloses an invention relating to the rate of increase in the temperature of the above-mentioned thermal working surface.

In addition to the combination of the discharging port, fluid passageway and electrothermal transducer (in which the fluid passageway is linear or right-angled) disclosed as the construction of the recording head in each of the above-mentioned specifications, the present invention covers also an arrangement using the art described in the specifications of U.S. Pat. Nos. 4,558,333 and 4,459,600, which disclose elements disposed in an area in which the thermal working portion is curved.

Further, it is permissible to adopt an arrangement based upon Japanese Patent Application Laid-Open No. 59-123670, which discloses a configuration having a common slot for the discharging portions of a plurality of electrothermal transducers, or Japanese Patent Application Laid-Open No. 59-138461, which discloses a configuration having openings made to correspond to the discharging portions, wherein the openings absorb pressure waves of thermal energy.

Furthermore, as a full-line type recording head having the length corresponding to the maximum recording width for a recording apparatus, the length of the recording head can be comprised of a plurality of recording heads as disclosed in the specification or a single recording head.

It is permissible to use a freely exchangeable tip-type recording head attached to the main body of the apparatus and capable of being electrically connected to the main body of the apparatus and of supplying ink from the main body, or a cartridge-type recording head in which an ink tank is integrally provided on the recording head itself.

The addition of recovery means for the recording head and spare auxiliary means provided as components of the printing apparatus of the invention is desirable since these stabilize the effects of the invention greatly. Specific examples of these means that can be mentioned are capping means for capping the recording head, cleaning means, pressurizing or suction means, and preheating means such as an electrothermal transducer or another heating element or a combination thereof. Implementing a preliminary discharging mode for performing discharging separately of recording also is effective in order to perform stabilized printing.

The printing mode of the printing apparatus is not limited merely to a printing mode for a mainstream color only, such as the color black. The recording head can have a unitary construction or a plurality of recording heads can be combined. The apparatus can be one having at least one recording mode for a plurality of different colors or for full-color recording using mixed colors.

Further, ink is described as being the fluid in the embodiments of the invention set forth above. The ink used may be one which solidifies at room temperature or lower, or one which liquefies at room temperature. Alternatively, in an ink-jet arrangement, generally the ink is temperature-controlled by regulating the temperature of the ink itself within a temperature range of between 30° C. and 70° C. so that the viscosity of the ink will reside in a region that allows stable discharging of the ink. Therefore, it is permissible to use an ink which liquefies when the printing signal is applied.

In order to positively prevent elevated temperature due to thermal energy when this is used as the energy for converting the ink from the solid state to the liquid state, or in order to prevent evaporation of the ink, it is permissible to use an ink which solidifies when left standing. In any case, the present invention is applicable also in a case where use is made of an ink which solidifies in response to application of thermal energy, such as an ink solidified by application of thermal energy conforming to a printing signal or ink which has already begun to solidify at the moment it reaches the recording medium. Such inks may be used in a form in which they oppose the electrothermal transducer in a state in which they are held as a liquid or solid in the recesses or through-holes of a porous sheet, as described in Japanese Patent Applications Laid-Open Nos. 54-56847 and 60-71260. In the present invention, the most effective method of dealing with these inks is the above-described method of film boiling.

In the embodiment, the ink-jet recording type is adopted, however, this does not impose a limitation upon the invention. For example the invention can be applied to a laser beam type or a thermal transfer recording type.

The present invention can be applied to a system constituted by a plurality of devices or to an apparatus comprising a single device. Furthermore, the invention is applicable also to a case where the object of the invention is attained by supplying a program to a system or apparatus.

As described above, memories conventionally provided in each system are incorporated and a single memory can be shared in the facsimile controller system and printer system, and an interface between both systems is not required. Accordingly, the printer facsimile system can be minimized and the cost can be reduced.

As many apparently widely different embodiments of the present invention can be made without departing from the spirit and scope thereof, it is to be understood that the invention is not limited to the specific embodiments thereof except as defined in the appended claims.

What is claimed is:

1. An image communication apparatus comprising:

first receiving means for receiving image data transmitted via a line;

second receiving means for receiving image data from an external host device;

storage means for storing image data;

control means for controlling said storage means to store either image data received by said first receiving means in response to a first data storing request in a first storing process or image data received by said second receiving means in response to a second data storing request in a second storing process, and controlling to read out the image data from said storage means in response to a data reading request, said control means giving priority to the first storing process over the second storing process, said control means further giving priority to both of the first and second storing processes over reading image data from said storage means in response to the reading request; and recording means for recording an image on a recording material based on the image data read out from said storage means.

2. An image communication apparatus according to claim 1, wherein said second receiving means includes a printer interface circuit.

3. An image communication apparatus according to claim 1, wherein said first receiving means receives coded image data transmitted via the line.

4. An image communication apparatus according to claim 1, wherein said recording means comprises a recording head which discharges ink based on the image data.

5. An image communication apparatus according to claim 4, wherein said recording head discharges ink from a discharging port by bringing about state exchanges of the ink caused by thermal energy.

* * * * *

UNITED STATES PATENT AND TRADEMARK OFFICE
CERTIFICATE OF CORRECTION

PATENT NO. : 6,009,244

DATED : December 28, 1999

INVENTOR(S) : TOSHIJI KUBOTA

It is certified that error appears in the above-identified patent and that said Letters Patent is hereby corrected as shown below:

COLUMN 1

Line 24, "to" should be deleted.
    Line 32, "200b ," should read --200b,--.

COLUMN 2

Line 10, "on" should read --an--.
    Line 63, "wherein" should read --in--.

COLUMN 12

Line 44, "a waited." should read --awaited.--.
    Line 61, "not" should be deleted.
    Line 62, "to" should read --not--.

COLUMN 13

Line 1, "1O1d" should read --101d--.
    Line 9, "is not" should read --of which need not be--.

UNITED STATES PATENT AND TRADEMARK OFFICE
CERTIFICATE OF CORRECTION

PATENT NO. : 6,009,244

DATED : December 28, 1999

INVENTOR(S) : TOSHIJI KUBOTA

It is certified that error appears in the above-identified patent and that said Letters Patent is hereby corrected as shown below:

COLUMN 14

Line 27, "of-U.S." should read --of U.S.--.

Signed and Sealed this

Third Day of April, 2001

Attest:

NICHOLAS P. GODICI

*Attesting Officer*     Acting Director of the United States Patent and Trademark Office